United States Patent Office 3,113,134
Patented Dec. 3, 1963

3,113,134
PROCESS FOR THE PRODUCTION OF RESERPIC ACID DIESTERS
Alfred Popelak, Mannheim, and Gustav Lettenbauer, Lampertheim, Hesse, Germany, assignors to C. F. Boehringer & Soehne G.m.b.H., Mannheim-Waldhof, Germany, a German corporation
No Drawing. Filed July 5, 1962, Ser. No. 207,813
Claims priority, application Germany July 29, 1961
10 Claims. (Cl. 260—287)

This invention relates to reserpic acid diesters and more particularly to a method of producing such diesters.

The reserpic acid diesters of this invention are useful as medicinal agents. These compounds possess hypotensive, tranquilizing and sedative properties. Some of them may be used as intermediates for the production of other pharmaceutically effective reserpic acid derivatives.

The esterification of the free hydroxyl group of the methyl ester of reserpic acid by reaction with an acid chloride or anhydride in the presence of pyridine is known and has been described in German Patent 1,033,211. Because of the great sensitivity of the methyl ester of reserpic acid to acids and in particular to acid chlorides, the yield of diester is very low. Furthermore, a great excess of acid chloride (to above 6 mols) must be used and the time required for the reaction amounts to several days. The preparation of the diesters by this known method results in the recovery of markedly colored crystals and additionally resinous by-products are formed, which generally have to be removed by protracted chromatographic treatment in aluminum oxide columns.

Recently a process has been proposed for the esterification of alcohols sensitive to treatment with acids (Angew. Chem., 71, 194 (1959)), in which the alcohols are converted into the corresponding esters by reaction thereof with an imidazolide of a carboxylic acid or sulfo acid. However, this method cannot be used for the esterification of the free hydroxyl group of the methyl ester of reserpic acid in that absolutely no conversion or esterification takes place.

In accordance with the invention, it has now surprisingly been found that diesters of reserpic acid can be prepared and more particularly the esterification of the methyl ester of reserpic acid can be carried out by reaction between the methyl ester of reserpic acid and an N-acyl imidazole, if the reaction is carried out in the presence of an alkali hydride and preferably in the presence of one mol of an alkali hydride. Under these conditions there is obtained within a short time a substantially quantitative esterification; neither resinous nor colored by-products are formed, whereby the subsequent processing is very much simplified.

The imidazolides to be used in the conversion reaction may be produced by reaction of an acid halide and imidazole (Ber., 46, 1912 (1913)) or by reaction of an acid and N-N'-carbonyl-diimidazole (J. Am. Chem. Soc., 82, 4596 (1960)).

Among such imidazolides are N-acetyl imidazole, N-pivaloyl imidazole, N-N'benzoyl imidazole, N-3,4,5-trimethoxy-cinnamoyl-imidazole, N-tosyl-imidazole, etc.

The following examples are given in order to more clearly disclose the nature of the present invention. It should be understood, however, that the examples are not intended to be a limitation on the scope of the invention.

Example 1.—O-Acetyl-Methyl Reserpate

To 2 g. methyl reserpate and 0.8 g. N-acetylimidazole (melting point: 104° C.) dissolved in 20 ml. absolute dimethyl-formamide, there is added 0.23 g. of a 50% suspension of sodium hydride in paraffin. After one hour at room temperature, water is added to the reaction mixture and the resulting mixture is extracted with benzene. The benzene solution is washed several times with water, dried over sodium sulfate and thereafter dried in vacuo. There are obtained 2.07 g. of residue. O-acetyl-methyl-reserpate (melting point: 285° C.) is recovered after one re-crystallization from isopropanol in an about 80% yield.

Example 2.—O-Pivaloyl-Methyl-Reserpate 2 g. methyl-reserpate and 1.1 g. N-pivaloyl-imidazole (melting point: 51–52° C.) are dissolved in 20 ml. of dimethyl formamide and to the solution there is added 0.23 g. of a 50% suspension of sodium hydride in paraffin. After remaining for one hour at room temperature, complete esterification has taken place. The reaction mixture is neutralized with dilute acetic acid and the dimethyl-formamide distilled off in vacuum. The residue is taken up in water, the pH adjusted to the alkaline range with dilute ammonia and thereafter extracted with benzene. The benzene extract is washed with water, dried over sodium sulfate and further dried in vacuo. There are obtained 2.45 g. of a light-colored residue from which there is re-crystallized from isopropanol in over an 80% yield O-pivaloyl-methyl-reserpate having a melting point of 250° C.

Example 3.—O-Benzoyl-Methyl-Reserpate 1 g. of methyl-reserpate and 0.65 g. N-benzoyl-imidazole (melting point: 19° C.) are dissolved in 50 ml. absolute tetrahydrofurane and the solution treated with 0.116 g. of a 50% suspension of sodium hydride in paraffin. After 2 hours the reaction mixture is neutralized with dilute acetic acid and the tetrahydrofurane distilled off in vacuo. The evaporation residue is taken up in water, the pH adjusted with dilute ammonia to the alkaline range and extracted with benzene. After washing with water and drying over sodium sulfate, the benzene is distilled off in vacuum. There is obtained 1.08 g. of a light-colored residue from which by one re-crystallization from isopropanol there is recovered in about 80% yield colorless crystals of benzoyl-methyl-reserpate having a melting point of 228–230° C.

Example 4.—Rescinnamine 1.0 g. methyl-reserpate and 1.1 g. N-3,4,5-trimethoxy-cinnamoyl-imidazole having a melting point of 160° C. are dissolved in 20 ml. dimethyl-formamide and the solution treated with 0.12 g. of a 50% suspension of sodium hydride in paraffin. After 2 hours the reaction mixture is worked up as described in Example 2. From the dry residue remaining, there is obtained following re-crystallization from isopropanol/methanol (2:1) in a very high yield pure rescinnamine having a melting point of 234–236° C.

Example 5—O-Tosyl-Methyl-Reserpate 4.95 g. N-tosyl-imidazole and 6.15 g. methyl-reserpate are dissolved in 50 ml. absolute dimethyl-formamide and the solution treated with 0.9 g. of a 50% suspension of sodium hydride in paraffin. After standing for 4 hours at room temperature 500 ml. ice water are added to the reaction mixture which is thereafter extracted several times with methylenechloride. The combined extracts are washed with water, dried over sodium sulfate and taken up in 50 ml. benzene. After distilling off of the methylene chloride, an almost colorless crystallization is obtained, and about 70% yield of O-tosyl-methyl-reserpate having a melting point of 225° C. is thus directly recovered.

In place of the sodium hydrate used in the preceding Examples 1 to 5, there may be employed other alkali metal hydrides, as for example potassium or lithium hydride, and substantially the same results will be obtained. However, we prefer sodium hydride since it is a relatively cheap agent which is commercially available. The alkali metal hydrides may be used in pure form or together with an inert solvent. Because of their inflammability the alkali metal hydrides preferably are used in the form of a suspension thereof in suitable inert solvents. Especially favorable results are obtained by employing the sodium hydride suspensions in paraffin offered by Fluka, Buchs, Switzerland, and Schuchardt, Munich. The paraffin used in preparing said suspensions is a soft wax so that the resultant suspensions represent crumby powders which are easy to handle.

The reaction is carried out at normal pressure and at room temperature. In case if the reactants are extremely sensitive, the reaction mixture may be cooled down to −20° C. On the contrary, if the compounds show some slowness in reaction, the mixture may be heated up to 50° C. The solvents used in that reaction must be inert towards alkali metal hydrides, and they are not allowed to have esterifiable groups, naturally. Suitable solvents are ethers, especially cyclic ethers such as tetrahydrofurane and dioxane, and N-substituted carboxylic acid amides such as dimethyl formamide.

In the disclosure and claims, the term "acyl" is used to denote the residue of a saturated or unsaturated, substituted or unsubstituted, aliphatic araliphatic, cycloaliphatic or aromatic carboxylic acid or sulfo acid.

We claim:

1. A process for preparing diesters of reserpic acid which comprises reacting the methyl ester of reserpic acid with an N-acyl-imidazole in the presence of an alkali metal hydride and recovering the diester of reserpic acid thereby formed.

2. Process according to claim 1 wherein said reaction is carried out in the presence of 1 mol of said alkali metal hydride.

3. Process according to claim 1 wherein said alkali metal hydride is sodium hydride.

4. A process for preparing diesters of reserpic acid, which comprises reacting the methyl ester of reserpic acid with an N-acyl-imidazole in the presence of 1 mol of sodium hydride and recovering the diester of reserpic acid thereby produced.

5. Process according to claim 1, wherein said sodium hydride is in the form of a suspension in paraffin.

6. A process for preparing O-acetyl-methyl-reserpate which comprises reacting methyl reserpate with N-acetyl-imidazole in the presence of sodium hydride and recovering the O-acetyl-methyl-reserpate thereby formed.

7. A process for preparing O-pivaloyl-methyl-reserpate which comprises reacting methyl reserpate with N-pivaloyl-imidazole in the presence of sodium hydride and recovering the O - pivaloyl - methyl - reserpate thereby formed.

8. A process for preparing O-benzoyl-methyl-reserpate which comprises reacting methyl reserpate with N-benzoyl-imidazole in the presence of sodium hydride and recovering the O - benzoyl - methyl - reserpate thereby formed.

9. A process for preparing rescinnamine (3,4,5-trimethoxycinnamic acid ester of methyl reserpate) which comprises reacting methyl reserpate with N-trimethoxycinnamoyl-imidazole in the presence of sodium hydride and recovering the rescinnamine thereby formed.

10. A process for preparing O-tosyl-methyl-reserpate which comprises reacting methyl reserpate with N-tosyl-imidazole in the presence of sodium hydride and recovering the O-tosyl-methyl-reserpate thereby formed.

References Cited in the file of this patent

Staab: Angew. Chem., volume 71 (1959), page 194.
Theilheimer, Synthetic Methods, volume 14 (1960), page 84 (article No. 164).